United States Patent
Olejack et al.

[11] Patent Number: 6,138,081
[45] Date of Patent: Oct. 24, 2000

[54] DATA ACQUISITION SYSTEM AND METHOD FOR MONITORING GAS TURBINE ENGINE TESTING

[75] Inventors: John E. Olejack, Toms River, N.J.; Richard Shipman, Woodstock, Ga.

[73] Assignee: CMR Technologies, Inc., Island Heights, N.J.

[21] Appl. No.: 09/057,702

[22] Filed: Apr. 9, 1998

[51] Int. Cl.⁷ .......................... G01G 19/00; G01G 11/30
[52] U.S. Cl. .................. 702/104; 702/182; 701/100; 701/101; 73/116
[58] Field of Search ...................... 702/104, 123, 702/56, 57, 130, 132; 700/86; 701/29, 99, 100; 324/121 R, 76.19, 76.24, 418; 73/116, 147

[56] References Cited

U.S. PATENT DOCUMENTS

| | | |
|---|---|---|
| 4,215,412 | 7/1980 | Bernier et al. .......................... 701/100 |
| 4,217,755 | 8/1980 | Williams .................................. 60/39.75 |
| 4,277,972 | 7/1981 | Wolschlager .......................... 73/862.16 |
| 4,729,218 | 3/1988 | Haselbauer et al. .................... 60/39.33 |
| 4,812,996 | 3/1989 | Stubbs ...................................... 702/123 |
| 5,293,775 | 3/1994 | Clark et al. ................................ 73/116 |
| 5,318,449 | 6/1994 | Schoell et al. .......................... 434/305 |
| 5,477,149 | 12/1995 | Spencer et al. .......................... 324/418 |
| 5,648,898 | 7/1997 | Moore-McKee et al. ................ 700/86 |
| 6,031,566 | 2/2000 | Leo .......................................... 348/82 |

*Primary Examiner*—Kamini Shah
*Attorney, Agent, or Firm*—Frank J. Bonini, Jr.; John F. A. Earley; Harding, Earley, Follmer & Frailey

[57] ABSTRACT

A testing system for the automatic acquisition, scaling, conditioning, calculating, recording and displaying of various channels of engine/dynamometer generated electrical signals for a gas powered turbine engine in the form of an animated user display graphic, which simultaneously presents a series of condition graphics for display on a monitor to provide an operator with a visual inspection of engine operations.

20 Claims, No Drawings

DATA ACQUISITION SYSTEM AND METHOD FOR MONITORING GAS TURBINE ENGINE TESTING

BACKGROUND OF THE INVENTION

1. Field of the Invention

The present invention relates to the field of diagnostic systems for the maintenance of gas turbine engines.

2. Brief Description of the Prior Art

Gas turbine engines are widely used in aircraft, including airplanes and helicopters, including turbo shaft and turbo prop craft, and are even employed to power missiles. Because of the safety requirements demanded by the operation of such craft, and the reliability necessitated, testing must be done routinely to ensure that the engine operation is sufficient.

Generally, gas turbine engines operate by igniting a mixture of injected fuel and compressed air within a combustion chamber or assembly and then channeling the output of exiting combustion gases to drive a turbine stage. The engine can be mounted within an outer housing. The outer housing can include a duct formed in part by an inner housing, through which a flow of air is directed. The airflow can be directed with a fan to exhaust with a portion of the airflow being directed to a high-speed compressor. Air from the compressor is directed to a combustor for combustion with injected fuel. Additionally, some engines will route air not taken up by the compressor to exhaust in order to increase thrust.

Gas turbine engines generally operate by using a continuous combustion process. The inlet air temperature and pressure is raised by a compressor, after which the air is moved into a burner or combustion chamber. Fuel is injected into the chamber and then combusted to raise the air temperature. The heated fuel air mixture, now under a high pressure and at a high temperature, is expanded and cooled through a turbine. The turbine speed can be controlled by the amount of fuel that is injected into the combustion chamber, and the amount of high pressure air which passes therethrough. Gas turbine engines may have a single moving rotor or can contain multiple rotors, such as, for example, wherein the engine includes a gas generator rotor and a power turbine rotor. Although these rotors may be the only moving parts, gas turbine engines must rely on a variety of parameters to function and meet the load and operating demands.

A variety of engine tests are performed in order to maintain the engine in an operative condition. Usually, the testing engineer will attach instruments to various locations on the engine to obtain readings of engine operation parameters. The engineer will operate the engine and read numerical data from the instruments. The values obtained from the readings must then be compared to determine whether the engine will meet the specified parameters which enable it to be placed in operation.

Testing often requires a plurality of instruments. The operator or engineer uses the instruments to obtain readings of the engine parameters when the engine is operated under controlled conditions which the operator also records. The operator utilizes the readings taken from the instruments to provide further information concerning a test parameter. The testing usually requires the operator to ascertain a given parameter, and then take a reading of a subsequent parameter. The parameters generally are read from instruments successively, and cover a time span of operation for the engine. The operator may therefore recheck parameters which appear to be excessive or out of the expected range. However, this will require a recheck of additional values as well, necessitating a repeat of the entire test procedure.

While there exist instruments which will display digital information or can provide a reading on a dial, these also require that the user view the data at a particular point in time. Where multiple instrumentation is used to measure various parameters, the operator usually will record the data, and when each parameter has been ascertained compare the results to determine engine performance.

A change in the engine operation can affect the parameters being analyzed, as can a change in the engine testing environment. The environment, particularly the surrounding temperature and atmospheric pressure, can affect the operation of the gas turbine engine. The test results obtained with instruments must be considered with respect to the atmospheric and temperature conditions at the time taken. For example, if the surrounding air temperature increases or decreases by even a couple of degrees, the engine operating requirements may also be altered. In such a circumstance, if the operator did not note a temperature change in the environment throughout a testing cycle, the engine might be passed or failed, incorrectly.

A need exists for a real time analysis system which provides visual information representative of a grouping of results for an engine which is being tested.

SUMMARY OF THE INVENTION

The present invention provides a novel data collection and analysis system for testing gas turbine engines with an animated display of visual parameters representative of the forms of individualized and integrated data pertaining to an engine.

The system of the present invention provides an operator prompted and controllable data collection and analysis system which conditions, calculates records and displays various channels of engine/dynamometer generated electrical signals which are representative of an operating parameter or condition and displays the outcome in an animated graphic presentation to a display for view by an operator. In addition to engine and dynamometer signals, the system can also integrate ambient condition signals which are generated by temperature sensors and pressure transducers. The ambient condition signals can be utilized in conjunction with the engine/dynamometer signals to contribute to the graphics display. A single graphics display can take into account the ambient condition signals without further operator conduct. The system further can integrate channel signals to provide further information to an operator, which information can be displayed on the single graphic display.

The animated graphics display means of the present invention provides an operator with a plurality of result graphics.

The system of the present invention includes collection means to collect information from the engine to be tested and to collect information from the environment in which the engine is tested, processor means to process the information collected, storage means to store the data being collected and for storage of specifications for an engine to be tested. Sensor means are connected to the engine and through a controller are sent to the processor means. Visual display means is provided to present a graphic representation of a plurality of the gas turbine engine parameters. The visual display means further includes zone identification means for visually presenting the relative engine operation parameter. Remote means is also provided to facilitate a review of engine testing where the system operator is in a location other than that of the engine and engine operator.

A primary object of the present invention is to provide an automated system for analyzing gas turbine engine operation in a range of operating environments.

Another object of the present invention is to provide a diagnostic capability of ascertaining real time parameters of a gas turbine engine and displaying integrated results.

A further object of the present invention is to provide assisted zeroing of the sensors through the presentation of graphics displays.

An additional object of the present invention is to provide an animated graphic for display which represents a plurality of engine parameter conditions.

Another object of the present invention is to provide an intelligent analyzing system which continually monitors the engine being tested to provide an indication of engine operation status.

It is another object of the present invention to accomplish the above objects with an indicator presented to the operator on the display as to whether an engine has passed required testing parameters.

Another object of the present invention is to store data collected by the system and further to provide a regeneration of display graphics which represent the parameters and conditions in effect at the time of the test.

In the present invention, it will be understood that portions of the disclosure of this patent document contain material which is subject to copyright protection. The copyright owner has no objection to the facsimile production by anyone of the patent document or patent disclosure, as it appears in the Patent and Trademark Office patent file or records, but otherwise reserves all copyright rights whatsoever.

DETAILED DESCRIPTION OF THE INVENTION

The present system for automatic data acquisition and diagnostics is described in relation to a gas turbine engine used for an aircraft. The engine is tested in an operating environment which can have temperature ranges of those throughout the world. In addition, the gas turbine engine also requires that the atmospheric pressure of the testing environment be known since it can have an effect on the engine parameters which are to be measured. A dynamometer is employed to measure certain engine operating characteristics. Generally the dynamometer will include a stationary or non-rotating housing in which is carried a rotatable input shaft adapted to be connected to a rotating output element of the engine undergoing testing to be rotatably driven thereby. The present invention measures parameters from the engine and dynamometer and incorporates the data obtained into an animated user graphic.

The present system utilizes hardware which can be commercially purchased, including a CPU (computer comprising a motherboard with a processor), a storage device, such as for example, removable magnetic media or a hard disk drive, display means for displaying a graphics image in the form to be presented to the user, interactive means for permitting user input and selection from options presented to the user, sensor means for sensing information from a given part of an engine to be tested, and controller means for providing information to the processing means from the sensor means.

The processor means further has calibration means for storing user-input values. The calibration means permits the user with the interactive means to calibrate each channel displayed on the display means. The channels are displayed as a graphics means, which is in real time with the associated sensor, such that the graphics means displays on the display means the actual activity of the engine to be tested in the form of a user graphic. The user is permitted to zero certain of the channels by superimposing over the graphics means display a user graphic with the interactive means. The interactive means enables the user's superimposed graphic representation to be perceived by the processing means and taken as the value which the processor means should use for the signal which the user caused to be generated. The signal causation is accomplished by the user injecting a known signal into the sensor or other path which directs the known signal to the sensor, and ultimately to the processor means which causes the signal to be displayed on the display means. The user has the option of replacing the signal value with a user assigned value.

A plurality of signal conditioners are also provided which can be calibrated with a known value, such as for example, a voltage signal, which is injected into the signal conditioner. The conditioner can then be adjusted on the basis of the known signal to correspond to the injected voltage. With the conditioners adjusted the signal processing can be calibrated with the interactive means on the display means with a plurality of calibration graphics. The calibration graphics are associated with user graphics which appear on the display means as the user selects. When a parameter is known by the user, the user, with the interactive means, can select a calibration graphic to represent the known parameter. For example, if the dyno shroud position is being calibrated, the user can set the dyno shroud to a known position using standard recommended procedures which are generally specified by the manufacturer, such as for example, where it is closed, or 0% open. The user can then proceed to calibrate the dyno shroud position indicator with the interactive means. A calibration graphic associated with the dyno shroud position is called for by the user with the interactive means. The calibration graphic is displayed with a user scalable element which is positioned by the user with the interactive means to the known dyno shroud position, for example, here 0%. The calibration graphic preferably has multiple components, including a zero or base adjust graphic and a span adjust graphic. For example, the dyno shroud position is then set to its 100% open position, in accordance with the engine dynamometer manufacturer's known recommended procedure. The span adjust graphic includes a user positionable element which is preferably adjusted by the user with interactive means to the present dyno shroud position. The calibration graphic, as described for the dyno shroud position, causes the user selected parameters to become associated with the component being observed. The associated values are then stored as a calibration storage set. When the calibrations have been performed for the elements from which the required parameters are to be measured, the stored calibration values are then associated with the processing of testing signal data obtained from the running test engine. The software causes the processor means to process the data obtained from the sensors and integrate that data with the calibration data. The processed data represents a real time operating parameter for one or more parameters of engine, dynamometer or other elements being analyzed. The real time data is processed and is associated with condition data. The condition data calls an associated condition graphic from storage (in random access memory, a hard storage device or an embedded logic device) and causes the graphic to be displayed on the display means.

The user graphic displayed on the display means can provide an animated representation of a parameter or condition which the engine is undergoing at that time. The user is presented with a graphic identifying the parameter or condition which the user has selected to be observed, or which the system presents to the user for observation.

The automatic data system of the present invention further provides diagnostic means for furnishing the user with output relating to a condition of engine operation. The diagnostic means preferably comprises condition means. A condition of the engine is assigned to a set of data stored in the data storing means. The data is stored as engine specifications. The condition means is activated by the processing means. The condition means, in turn, upon being activated, provides a user display graphic which is displayed on the display means along with the information causing the condition. The user therefore is alerted to the condition of the engine which has been diagnosed with the data collected by the sensors and fed through the processor means.

Condition means can be provided to have levels which are predetermined in accordance with engine specifications. In addition, the display graphics of the condition means can further include level means for displaying a level approximating a condition. For example, proximity to reaching a desired condition can be forewarned with level means. The level means is related to a cautionary display means which causes the display to present to the user a cautionary graphic, to signal to the user the approaching of a failure condition. The level means can also be associated with a stop means which causes the display to present to the user a stop graphic, to signal that a threshold level has been associated with the engine operating conditions.

A system according to an embodiment of the present invention was prepared as follows. Hardware was provided in the form of an intelligent data acquisition subsystem incorporating a 32 bit 68020 microprocessor with a 16-bit external bus, a Pentium processor system board and Pentium CPU operating at 2.1–3.5 volts VCC at a speed of 200 Mhz, with 32 megabyte (MB) random access memory (RAM), a mouse, a keyboard, a video card with 2 MB SGRAM, a 3.2 GB hard drive, a CD-ROM, and a video monitor. Other hardware, such as, for example, a modem, power supply regulators, additional storage devices such as tape drives, as well as printers, can also be utilized. The 68020 microprocessor speed was 16.67 Mhz and is associated with a high speed serial port (RS-485) which provides a communications interface between the 68020 Microprocessor and the sensors or modules carrying components to handle sensor signals.

The intelligent data acquisition subsystem further comprises an interface provided to route the signals from associated data acquisition modules, which for example, can comprise an analog brick module, to the 32-bit 68020 microprocessor. A first brick module is provided which houses two thermocouple/Millivolt high resolution, high-density Analog I/O interface cards. A second brick module is provided which houses two DC voltage input high resolution, high density analog I/O interface cards. Also provided on the computer unit are four DC input signal conditioners, three frequency input signal conditioners, one RTD input signal conditioner, an AC input signal conditioner, a strain-gauge input signal conditioner, and a thermocouple input signal conditioner. The components are wired for connection to an interface board.

Certain engine performance parameters which the system must account for include a barometric measurement component. A pressure transducer is provided and is connected to one of the DC voltage input high resolution, high-density analog interface cards in the second brick module. The pressure transducer can sample the test environment barometric pressure through a conduit. In the present example, the pressure transducer signal is sent to the second brick module. Preferably, the transducer continuously monitors the atmospheric pressure of the testing room or environment, and a continuous collection of data is processed to obtain a value used by the present system to perform calculations and cause to be displayed on the graphics display means, an animated graphic.

In the present example of a preferred embodiment, 210 terminal blocks are provided to interface the various components of the unit with the engine which is to undergo a test. Three groups of 70 terminal blocks each are provided. A thermocouple terminal board assembly is provided, which for example, comprises terminal strips for the thermocouple signals. The thermocouple can be associated with or connected to the temperature sensing system of the test environment for ascertaining the engine environment temperature. A signal is then delivered to the unit which is then processed and stored for immediate use, or further processed to provide an animated graphics display.

Data acquisition software is provided to reside in the 32-bit 68020 microprocessor. This software is utilized for monitoring, processing, calculating and recording of associated channels of engine, dynamometer, and engine run room environment generated electrical signals that are used to represent engine/dynamometer parameters and engine test environment parameters. The signals are also associated to provide a user graphic which is displayed on the graphics display means.

The software also includes a graphics display module which permits the data collection and integration to be accomplished and presented to the user in an animated format. In addition, the graphics display preferably is viewed to represent real time engine operation when the user graphics is displayed on the display means.

An array of channels is provided through which the monitoring of information from the engine to the unit is accomplished. The software used can monitor, process, calculate and associate the signals from the selected channels. Preferably, the software receives the electrical data generated by the engine, dynamometer and engine run room environment sensors (i.e. thermocouples, strain gauges, potentiometers, pressure transducers and other associated sensing means) through a communication link, which for example, can comprise a high speed serial port, such as an RS485, from the first and second brick module assemblies. The engine generated electrical signals represent temperatures, RPM, pressures, vibrations, spindle, stator vane and shroud positions and torque, fuel flow, and other associated parameters. Dynamometer generated electrical signals represent temperatures, pressures, shroud position and torque. Engine run room environment generated signals are associated with and represent ambient temperature and barometric pressure of the engine test environment. The software program continually monitors the aforementioned parameters. The parameter values can be stored, or further calculated to provide a result. The result is then used to cause a related user graphics to be displayed on the display means. For example, the performance parameters which determine the suitability of an engine in relation to its operating condition, such as for example, minimum Shpa@IRP, Shp, Shpk, Shpa, maximum Ng@IRP and other parameters, are calculated from the parameter values obtained and generated from the sensor signals. This provides the user with engine/ dynamometer performance parameters which are then associated with a user graphic and displayed on the display means. The animated user graphic preferably displays to the user the change observed in the performance parameter which the user is viewing. Additional associated graphics means include condition means which provides a condition level. The levels can be defined to be associated with a given parameter value or can be associated with one or more parameter values, including calculated parameter values derived from monitored parameter values. The condition levels graphics are displayed when one or more parameter requirements has or have been met, exceeded, or breached. Condition means further provides pinpoint graphics means which identifies a graphic of the condition which is breached.

The pinpoint graphic can comprise a parameter value and can also depict a representation of an associated part, such as, for example, an engine or dynamometer, and provide an associated pinpoint user graphic identifying the parameter value or value or values which caused the condition graphic to be displayed.

Gas turbine engines have associated performance graphs which are supplied by the manufacturer for governing the performance values at which the engine can operate. These values are predetermined, although the manufacturer can amend them from time to time, and can be preloaded onto the 32-bit motherboard to provide a resource of values from which to determine engine conditions.

While the parameters for engine operating values, and associated relative parameters can be furnished on the motherboard, the present system permits known user values to be adopted for calibration of the unit. For example, a known injection of a pressure or fuel flow can be performed by the user. The parameter which identifies the user's action can then be selected for display with the interactive means to cause the parameter to display on the display means its associated user graphic. The user graphic for the parameter, for example, can be provided to display the parameter value which the system identifies as being associated with the user action. The user, with the interactive means can interact with the user graphic to reassociate the user graphic with the value which the user action introduced into the system or engine being tested. This associated value can be used for subsequent parameter measurements, as well as for calculations.

The user therefore can select a value which the stored parameters can yield to, permitting the user's input or calibrated value to be the standard.

In an alternate embodiment, condition simulating means is provided to enable interruption of a signal with a user replaced parameter value. While the system is a real time oriented analyzer, the user action can be applied to the collected data to provide a hypothetical analysis and calculation of the parameter values or engine/dynamometer, or engine run room environment, as well as the conditions associated with the values. The conditions can be displayed on display means with a supplemental user graphic which is associated with the hypothetical condition. A comparative graphics means provides a comparative user graphic which is displayed on the display means and identifies the condition prior to the user action and the condition after the user action. This embodiment preferably includes means for blocking the input of user override parameters, such that when the hypothetical test is finished, the system is returned to and remains in the real time analyzing mode.

The temperature monitoring means of the present invention enables the monitoring, storing and displaying of the temperatures of associated temperature values for the engine being measured. The power turbine inlet is associated with a signal conditioner and voltage input channel of the I/O interface second brick module assembly. Other channels are associated with engine lube outlet, inlet air temperature (which is preferably associated with a plurality of channels which are averaged), dyno lube tank temperature, dyno lube outlet temperature (forward), and dyno lube outlet temperature (aft). The associated graphics means provide a user graphic which is displayed with the display means to animate the temperature values which are converted to temperature values from the thermocouple signals.

Associated condition graphics are also called up when the temperature values breach the range which has been preloaded in the 32-bit motherboard (or those values which the user has selected to override) and which causes the condition graphics to be displayed on the display means. Preferably, the condition graphic is displayed as part of the monitoring graphic which is associated with and displays the real time information for the parameter being measured. Preferably, the display means can contain a user graphic which contains a zone of predetermined parameters which are constantly displayed to the user when the system is in use. Particularly preferable is a constant display of real time operation parameters on the display means with a user input zone also present on the display means to identify and record selections and user input. Therefore, the user can at all times be presented with animated user graphics which show level means graphics and condition graphics on the display means. The display means can display animated real time information in the form of one or more user graphics. The user graphics can provide the user with an animated visual presentation which is representative of the items and parameters which the user desires to be concerned with, in a form visually perceptible on a single screen. The user graphic condition means and level means are preferably included with, and in addition to, real time data to appear concurrently along therewith. The real time data is presented in a digital form with pinpoint graphics. The pinpoint graphics display the real time value for the parameters being monitored.

In a preferred embodiment, for example, one or more engine fuel indicators can be associated to provide a group indicator. Fuel pressure and fuel flow can be ascertained with sensor means. A condition graphic means preferably can be associated with fuel parameters to provide a fuel condition indicator graphic. The fuel condition indicator graphic can have a fuel pressure component and a fuel flow component. The fuel condition graphic can be associated with one or more of the fuel parameters. A parameter or certain group of parameters can be assigned to the fuel condition graphic. The condition indicator can further be associated with level graphics to signal to provide a level graphic which is displayed on the display means. Preferably, each graphic component of the fuel group, such as, for example, the fuel pressure and fuel flow parameters, will have its own condition graphic and level graphic, in addition to the collectively associated fuel group condition graphic. Level graphics are also associated with each component condition graphic.

The fuel parameters condition graphics can be associated with other condition graphics to provide an array of graphics. The array of graphics can be provided in an animated form on the display means to permit a coordinated visual inspection of the engine operation. For example, the display means can display an array of graphics including a user work zone and a parameter graphics display zone. The user work zone can comprise a zone on the display means which includes a user interactive area, such as, for example, a user calibration zone. The user can interact with the system through the interactive zone. The parameter graphics display zone can be displayed simultaneously with the user work zone. Preferably, the parameter graphics display zone includes the display of the user graphics, including condition and level graphics, pinpoint graphics, and other graphics associated with parameters, or calculated associated data.

The monitoring signals are processed by the system continuously, and the system associates a condition level graphic with a parameter. When a parameter being monitored is challenged by the processor based on comparison with one or more known input values, a level graphic is selected for display, thereby replacing a previous level graphic which was displaying on the display means. This process continues until the unit is turned off. If the representative condition level is addressed by the user at the engine, dynamometer or other site, the condition level graphic will be restored to its state before the challenged value.

The dynamometer can be associated with dynamometer condition graphics. The dynamometer condition graphics can include an animated dyno status graphic with dyno condition graphics associated with dyno monitoring channels. For example, dyno monitoring channels can include one or more channels which are associated with dyno lube pressure, dyno lube temperature, and dyno lube temperature differentials including dyno lube temperature (fwd) and dyno lube temperature (aft). The dynamometer condition graphics can be associated with one or more of the dyno monitoring channels to provide an animated visual graphic which is displayed on the display means. The information from the dyno monitoring channels is processed by the processor means and the real time values for the dyno parameters displayed on the display means with an associated condition means.

The system of the present invention further includes a vibration monitoring means. The vibration monitoring means includes a plurality of channels which are monitored by the system. The channels are associated with one or more vibration monitoring graphics which are displayed on the display means. The data from the monitoring channels is processed and associated with graphics means. Preferably, the graphics means includes a pinpoint graphic which is displayed on the display means to show a digital representation of the vibration signal along with an analog graphic displayed on the display means to show a representation of the parameter being monitored by a channel. The analog graphic display means can include, for example, level means associated with a condition which is being monitored with the system. The level means can provide an animated user graphic which is presented on the display means in association with the digital graphic. Examples of channels which are associated with the vibration monitoring means include engine exhaust frame vibration (vertical), accessory gearbox vibration, engine exhaust frame vibration (horizontal), dynamometer vibration (aft—vertical) and dynamometer vibration (fwd—horizontal). In addition, the analog graphic can comprise a gauge display graphic incorporating the real time parameter values for presentation with the gauge display graphic. The gauge display graphic preferably is animated to associate the real time parameters, including a calculated parameter based on one or more other parameters, with a representation of the real time parameter relative to a scale graphic.

Other monitoring means provided with the present system include engine oil monitoring means, load demand spindle position monitoring means, and position monitoring means including stator vane position monitoring means and dyno shroud position monitoring means, each of which are associated with a channel through which the condition parameters for the associated monitoring means are obtained. Associated graphics means is provided for each of the respective monitoring means. The graphics means can include level graphics and pinpoint graphics which are displayed on the display means in relation to each other to display the real time condition associated with the parameters being monitored at that time.

In addition, a condition graphic can also be associated with the parameters to provide an animated graphic which is displayed on the display means.

The power turbine inlet temperature (TGT), the gas generator speed (% Ng) and the power turbine speed (Np) are additional parameters which can be monitored with the present system. Associated channels representing these parameters monitor the input from the sensors which are deployed on the engine. The processor utilizing software converts the signals to the equivalent format, temperature (for TGT) RPMs for % Ng and Np. Graphics means are associated with each of these parameters being monitored. The graphics means further includes an associated condition graphic for each parameter being monitored. The condition graphic includes level graphic means which provides an animated graphic for display on the display means to signify one or more of a stop graphic, a warning graphic and a normal graphic. The condition graphic preferably is provided proximate to the pinpoint graphic and analog graphic which are displayed on the display means.

Engine power and dyno power indicators are also included as components which the system monitors. For example, the engine power indicator preferably comprises the integration of data from one or more channels to comprise a real time indicator which is the collective result engine power derived from the signal data which is calculated by formulas contained within software. The software enables the calculations to be carried out and the result associated with a user graphic for display on the display means. For example, the user graphic can display the pinpoint graphic comprising the real time parameter value associated with the calculated data result. Examples of engine power and dyno power data include Shp, Shpa and Shpk. The display means displays a graphic which is the real time value for the engine power and dyno power parameters. Condition graphics can also be included with level graphics. The condition graphics can include an animated analog bar which moves corresponding to the parameter being monitored. The condition level graphics can include zones along the analog bar which correspond to a condition presented by the data being monitored. In addition, the level graphic can be associated with the pinpoint graphic of digital parameter values to correspond the digital parameter values being displayed with the condition level graphic being displayed on the analog bar.

The user graphics can further include analog display graphics which can comprise bars, lines, needles, segments, and the like which are animated to correspond to one or more parameters being monitored, or calculated by the present system. The analog display graphics can further comprise condition graphics which include level graphics. The condition graphics and level graphics can include forecast means graphics which are present in conjunction with the analog display graphics. The forecast means graphics can provide a display of a condition not yet recorded but if encountered one that would cause the condition level graphic to change. This display of the forecast means graphic can be provided in the form of zones appearing in conjunction with the analog display graphic which represent potential failure or fault levels of the engine being tested.

The user graphics preferably are stored in graphics display software loaded onto or embedded in the motherboard of the computer or CPU. The software operates in association with the data monitoring, recording, calculating and processing software which resides in the 68020 microprocessor. The processed signals are used by the graphics display software to associate a plurality of user graphics which are then presented to the display means for presentation to the user. Animated graphics are displayed to represent the real time condition and operation of the turbine engine undergoing testing.

Identification means graphics can be included to identify to the operator on the display means the area of the engine or dynamometer which is being monitored, and the associated parameter. The identification means graphics can preferably comprise an engine representation graphic or dynamometer representation graphic displayed on the display means. Associated user graphics corresponding to or derived from the signals being monitored from the sensors are displayed on the display means in association with the identification means graphics, and further can have an identifying graphic corresponding the identification means graphic to the associated user graphic. For example, the associated user graphic may comprise dynamometer information such as bearing temperatures (fwd. and aft.), vibration levels (fwd. and aft.), lube temperature and pressure, torque and shroud position parameters provided as a pinpoint graphic, along with associated condition graphics, level graphics, and other graphics. The dynamometer condition graphic, for example, may appear simultaneously with the other graphics, such as for example the pinpoint graphic. The pinpoint graphic can therefore include a condition identifying graphic which can change as one or more of the continually monitored condition changes. For example, a condition graphic can appear simultaneously with a pinpoint graphic on the display means at the same location. Preferably, the identification means graphics and associated graphics are displayed in the user work zone, wherein the parameters being monitored by the system are concurrently continuously displayed on the display means in the parameter graphics display zone. The parameter graphics display zone may therefore comprise information regarding the dynamometer which is also displayed in the user work zone in conjunction with the identification means graphics.

Remote communication means can also be provided for system operation from a location other than that of the engine being tested. Remote communications means can include a communications link connecting the system monitoring the engine to a remote operating device, such as, for example, remote interactive means. The remote communications means further includes supplementary display means. Information and condition graphics are communicated by the remote communications means for presentation on the display means and on said supplementary display means. The remote communications means permits a remote user to operate the system with remote interactive means. Preferably, the display means and supplementary display means display the same graphics to the site operator and the remote user. The remote communication means can further include means for disabling the site interactive means, so that only the remote user interactive means can operate the system. Means for disabling the remote interactive means, wherein said means for disabling prevents the remote user from operating said system but permits display of the same graphics on the supplemental display means as those being displayed on the display means at the engine test site, including real time graphics.

The present invention further comprises engine performance evaluation means for testing the performance of the engine being monitored by the system. The performance evaluation means includes a performance graphic which, for example, can be displayed on the display means. The performance graphic provides an indication of engine operation status. Engines being tested by the system are evaluated to determine whether the engine when operated meets required operating parameters. For example, the engine must produce a minimum power output, i.e. measured as engine shaft horsepower. In addition, other parameters are monitored and compared to accepted parameter values processed through the intelligent data acquisition subsystem. Calculations on data being monitored by the system are made. The calculations can incorporate one or more signals being monitored with the sensors. A performance graphic, for example, can include an indicator graphic to display on the display means a pass or fail condition for the engine being tested. The pass or fail condition is ascertained based on a number of parameters monitored by the system. The result of the system monitoring can provide a real time performance evaluation of the engine operating condition. Printer means can also be provided with the present system. The printer means can print real time or recorded information which the system monitors, or which the system calculates based on information monitored and recorded by the system. The performance evaluation graphic is displayed on the display means. The operator can select to display on the display means the user graphics, including condition graphics, pinpoint graphics, level graphics, analog display graphics, and other graphics which are presented to the user when viewing the display means, which are associated with the engine performance parameters representative of the parameters used for determining the engine performance test. The display means, preferably, can display the engine performance graphics in the user work zone of the display means and display in the parameter graphics display zone. The parameter graphics display zone can be printed on the printer means to provide a record of the monitored parameters of engine operations which are recorded by the sensors as are represented by associated user graphics on the display means. The performance parameters can also be stored on the storage means for reference at a later time.

The performance evaluation means further can comprise alerting means for alerting the operator of a malfunction. Preferably the alerting means includes an alerting graphic which is called from memory by the processor and displayed on the display means when a parameter or calculated value based on a parameter is not in compliance with the acceptable values stored in the intelligent data acquisition subsystem, such as, for example, those performance values which contain engine operating specifications which are preloaded and stored in the 32-bit motherboard. A malfunction graphic can be associated with the parameter which the processor challenges as not being in an acceptable range. The malfunction graphic can include a pinpoint graphic of one or more of the challenged parameters and can include an alerting graphic, which can comprise a graphic superimposed with or appearing with the challenged parameter value. The malfunction can further be explored by the system operator by selecting for display on the display means the malfunction real time parameters. The operator can select to display on the display means the user graphics, including condition graphics, pinpoint graphics, level graphics, analog display graphics, and other graphics which are presented to the user when viewing the display means, which are associated with the engine malfunction parameters representative of the parameters used for determining the engine performance test which led to the malfunction graphic being displayed on the display means. The display means, preferably, can display the engine performance graphics in the user work zone of the display means and display in the parameter graphics display zone the engine performance graphic. The parameter graphics display zone can be printed on the printer means to provide a record of the monitored parameters at the time the malfunction of engine operation was detected which are recorded by the sensors as are represented by associated user graphics on the display means. The performance parameters, inclusive of the malfunction or challenged parameters, can also be stored on the storage means for reference at a later time.

Further, the operator can select a specific performance evaluation test for the system to carry out. For example, if the alerting means identifies a malfunction to the operator, the operator can select a performance test for the system to complete which includes the parameter type associated with the malfunction. The system can be instructed by the user through the interactive means, by selecting a user graphic associated with the malfunction or specific engine performance item to provide the specific performance evaluation test and provide a user graphic showing the values of the selected evaluation test along with associated user graphics, including condition, level and other graphics, in the user work zone of the display means. The parameter graphics display zone can therefore display the graphics associated with the engine operation parameters so the operator can see their associated graphics as the user views the malfunctioning parameter graphics in the user work zone of the display means.

These and other advantages of the present invention can be made consistent with the spirit and scope of the invention as described herein and recited in the appended claims.

What is claimed is:

1. A system for the calibration and automatic acquisition, conditioning, calculating, recording and displaying various channels of engine/dynamometer generated electrical signals for a gas powered turbine engine in the form of an animated user display graphic, comprising:
   a) a data acquisition subsystem which is preprogrammed with parameters for engine operating values;
   b) a plurality of sensor means for sensing various engine operating parameters;
   c) communication linkage means for receiving signals from the sensor means;
   d) processor means for processing information collected with sensor means;
   e) storage means for storing processed information collected with the sensor means;
   f) display means for displaying a user graphic; wherein a plurality of user graphics with the engine operating parameters are provided and associated with an engine operating parameter;
   g) condition graphics means for displaying on display means an animated conditions graphic;
   h) wherein associated condition graphics are provided and are associated with a set of data recorded with sensor means and are called from a location in memory means to the processor for presentation as a condition user graphic on the display means.

2. The system of claim 1, wherein the associated condition graphics include a real time data value display and an animated graphic display, said animated graphic display being representative of a real time condition being sensed by the system.

3. The system of claim 2, wherein the animated graphic includes level graphic means, wherein an associated condition is represented by an animated graphic displayed by the level means.

4. The system of claim 1, wherein said animated conditions graphic comprises a gauge means graphic.

5. A system for the calibration and automatic acquisition, scaling, conditioning, calculating, recording and displaying of various channels of engine/dynamometer generated electrical signals for a gas powered turbine engine in the form of an animated user display graphic, comprising:
   a) a data acquisition subsystem which is preprogrammed with parameters for engine operating values;.
   b) a plurality of sensor means for sensing various engine operating parameters;
   c) communication linkage means for receiving signals from the sensor means; wherein said communication linkage means comprises a first brick module and a second brick module with a plurality of signal conditioners housed in said brick modules with channel means associating said signal conditioners, each said channel means being assigned to one of said plurality of signal conditioners and having channel calibration means for calibrating said associated signal conditioner; and with a plurality of interface cards housed in said brick modules;
   d) processor means for processing information collected with sensor means;
   e) storage means for storing processed information collected with the sensor means;
   f) interactive means for facilitating interaction of the user with the system, including means for selecting and controlling;
   g) display means for displaying a user graphic; wherein a plurality of user graphics with the engine operating parameters are provided and associated with an engine operating parameter;
   h) condition graphics means for displaying on display means an animated condition graphic;
   i) wherein associated condition graphics are provided and are associated with a set of data recorded with sensor means and are called from a location in memory means to the processor for presentation as a condition user graphic on the display means;
   j) pinpoint graphic means for displaying the digital value associated with a parameter;
   k) calibration means for calibrating the range of parameters associated with the operation of an element or associated parameter of an engine to be monitored, said calibration means including a user display calibration graphic including a user controllable graphics element;
   l) wherein condition graphics means includes engine environment condition graphics, engine torque condition graphics, engine operating condition graphics, dynamometer torque condition graphics, and dynamometer condition graphics; wherein the engine operating condition graphics includes an animated fuel group graphic associated with engine fuel pressure and fuel flow channels; and wherein said engine environment condition graphics includes a temperature graphic associated with engine environment temperature channels; and wherein said dynamometer condition graphics includes an animated dyno status graphic with dyno condition graphics associated with dyno monitoring channels, said dyno monitoring channels each being associated with one of said dyno lube pressure, dyno lube temperature, and dyno lube temperature differentials including dyno lube temperature (fwd) and dyno lube temperature (aft); and wherein said engine torque condition graphics includes a graphic associated with the engine torque monitoring channel and wherein the dyno torque monitoring channel includes a graphic associated with the dyno torque monitoring channel;

m) engine power graphics, said engine power graphics representing integrated data from one or more of said monitoring channels which has been processed with said processor means to calculate an engine power value, and associated with said engine power graphics to display an engine power graphic on the display means;

n) wherein said condition graphics appear simultaneously on said display means for collective viewing of the condition represented along with the associated parameter; and o) wherein said condition graphics include an animated condition level graphics said condition level graphics being simultaneously displayed on said display means for each condition graphic.

6. The system of claim 1, wherein the associated condition graphics include a real time data value display and an animated graphic display, said animated graphic display being representative of a real time condition being sensed by the system.

7. The system according to claim 1 of the present invention, further comprising remote communication means, and supplementary display means wherein information and condition graphics are communicated for presentation on the display means and on said supplementary display means.

8. A system for the automatic acquisition, scaling, conditioning, calculating, recording and displaying of various channels of engine/dynamometer generated electrical signals for a gas powered turbine engine in the form of an animated user display graphic, comprising:

a) a central processing unit with memory means;
b) a data acquisition subsystem which is preprogrammed with parameters for engine operating values said subsystem including a microprocessor;
c) interactive means for facilitating interaction of the user with the system, including means for selecting and controlling;
d) a plurality of sensor means for sensing various engine operating parameters;
e) communication linkage means for receiving signals from the sensor means and delivering said signals to said microprocessor, wherein said signals are monitored, processed for conversion to a representative parameter value and recorded;
f) storage means for storing said processed information received with the sensor means;
g) a plurality of user graphics;
h) association means for associating one or more of said plurality of user graphics with a parameter value;
i) display means for displaying said user graphics; wherein a plurality of user graphics with the engine operating parameters are provided, each said user graphic being associated with one or more engine operating parameters;
j) condition graphics means for displaying on display means an animated condition graphic representative of the real time condition being monitored for the associated one or more parameters;
k) wherein associated condition graphics are provided and are associated with a set of data recorded from the sensor means and are called from said memory means by a processor for presentation as a condition user graphic on the display means.

9. The system of claim 8, wherein the associated condition graphics include a pinpoint graphic comprising a real time data value display of a parameter, and an animated graphic display, said animated graphic display being representative of a real time condition being sensed by the system.

10. The system of claim 8, further comprising remote means communication means, and supplementary display means wherein information and condition graphics are communicated for presentation on the display means and on said supplementary display means.

11. A method for the automatic acquisition, scaling, conditioning, calculating, recording and displaying of various channels of engine/dynamometer generated electrical signals for a gas powered turbine engine in the form of an animated user display graphic, comprising the steps of:

a) providing a central processing unit with memory means;
b) providing a data acquisition subsystem which is preprogrammed with parameters for engine operating values said subsystem including a microprocessor;
c) monitoring with a plurality of sensor means various engine operating parameters;
d) delivering through a communications linkage means signals from the sensor means to a microprocessor; wherein the step of delivering said signals is continuous;
e) processing said signals for conversion to a representative parameter value;
f) recording said signals and storing said processed parameter values in storage means;
g) storing a plurality of user graphics in the central processing unit;
h) associating with said central processing means one or more of said plurality of user graphics with a parameter value;
i) displaying on display means said user graphics; wherein a plurality of user graphics with the engine operating parameters are provided, each said user graphic being associated with one or more engine operating parameters for display as a representation thereof;
j) displaying with said user graphic representative of engine operating parameters condition graphics displaying on display means an animated condition graphic representative of the real time condition being monitored for the associated one or more engine parameters.

12. The method of claim 11, further including the step of calibrating.

13. The method of claim 12, wherein the step of calibrating includes providing interactive means and interacting with said display means graphics to impose user selected parameters as the parameters used for reference values.

14. The method of claim 11, including providing remote communication means and supplementary display means, and communicating with said remote means processed information and associated condition graphics for presentation on said supplementary display means at a location remote from said processor means.

15. The system of claim 1, further comprising identification means graphics for display on display means of a representation of a signal generating element, including one or more of an engine and dynamometer, said identification means graphic further including associated user graphics displayed in association therewith, wherein said associated user graphics are associated with association graphics, and wherein each association graphic identifies the site on said representation of said signal generating element corresponding to the operating parameter being displayed by said user graphic.

16. The system of claim 2, further comprising identification means graphics for display on display means of a representation of a signal generating element, including one or more of an engine and dynamometer, said identification means graphic further including associated user graphics displayed in association therewith, wherein said associated user graphics are associated with association graphics, and wherein each association graphic identifies the site on said representation of said signal generating element corresponding to the engine operating parameter being displayed by said user graphic, and wherein said level graphics means are displayed simultaneously on the same location of the display means as the location on which the user graphic display of an operating parameter is displayed.

17. The system of claim 1, further comprising engine performance evaluation means, including an engine performance graphic which is selectively displayed on the display means, wherein said engine performance evaluation means includes alerting means comprising an alerting graphic said alerting graphic being displayed on said processor when a data parameter from said set of data monitored with the sensor means is challenged by comparison to said preprogrammed parameters for engine operating values, said alerting means further including a malfunction graphic associated with said challenged parameter, said malfunction graphic including a pinpoint graphic of said challenged parameter and an alerting graphic superimposed therewith to indicate a failure of said engine operation with respect to said challenged parameter.

18. The method of claim 11, further including the step of evaluating engine operation with evaluation means, and determining the sufficiency of engine operation relative to said preprogrammed engine operating parameters, wherein the step of evaluating engine operation includes providing interactive means and selecting with the interactive means a performance evaluation test graphic, automatically performing a performance evaluation test of an engine, wherein the step of processing said signals further includes the step of comparing said representative parameter value to a preprogrammed parameter and accepting or rejecting said representative parameter, wherein the step of rejecting said parameter further comprises associating said rejected parameter with a malfunction graphic and displaying said malfunction graphic on said display means.

19. The method of claim 14, further including the step of transmitting said stored parameter values from the storage means of said system to a remote storage means, and associating condition graphics with said transmitted stored parameter values for presentation on said supplementary display means.

20. The system of claim 1, further comprising printer means for printing said graphics displayed on the display means associated with a real time set of data.

\* \* \* \* \*